United States Patent
Braun

(10) Patent No.: US 8,122,641 B2
(45) Date of Patent: Feb. 28, 2012

(54) WATERING DEVICE FOR PLANT IRRIGATION

(76) Inventor: Linda Mae Braun, Courtenay (CA)

( * ) Notice: Subject to any disclaimer, the term of this patent is extended or adjusted under 35 U.S.C. 154(b) by 316 days.

(21) Appl. No.: 12/559,900

(22) Filed: Sep. 15, 2009

(65) Prior Publication Data

US 2010/0064579 A1     Mar. 18, 2010

Related U.S. Application Data

(60) Provisional application No. 61/097,387, filed on Sep. 16, 2008.

(51) Int. Cl.
    *A01G 25/00*     (2006.01)
(52) U.S. Cl. .......................................... 47/48.5
(58) Field of Classification Search .................. 47/48.5
    See application file for complete search history.

(56) References Cited

U.S. PATENT DOCUMENTS

| | | | | |
|---|---|---|---|---|
| 1,355,740 A | * | 10/1920 | Friend | 383/119 |
| 1,848,219 A | * | 3/1932 | Kerr | 47/14 |
| 1,988,307 A | * | 1/1935 | Fay | 71/64.13 |
| 1,996,898 A | * | 4/1935 | Brandell | 47/65.6 |
| 2,028,255 A | * | 1/1936 | Steinbach | 47/65.5 |
| 4,908,986 A | * | 3/1990 | Rowland et al. | 47/80 |
| 5,022,182 A | * | 6/1991 | Anderson | 47/48.5 |
| 5,162,052 A | * | 11/1992 | Hoffmann et al. | 47/8 |
| 5,181,951 A | * | 1/1993 | Cosse, Jr. | 71/64.11 |
| 6,606,821 B1 | * | 8/2003 | Connelly | 47/48.5 |
| 7,624,532 B2 | * | 12/2009 | Slater | 47/1.01 R |
| 2003/0066234 A1 | * | 4/2003 | Bussey, Jr. | 47/65.7 |
| 2009/0013598 A1 | * | 1/2009 | Mileto | 47/48.5 |
| 2010/0064579 A1 | * | 3/2010 | Braun | 47/48.5 |

* cited by examiner

*Primary Examiner* — Frank T Palo
(74) *Attorney, Agent, or Firm* — Gordon Thomson

(57) ABSTRACT

A plant watering device comprises a pair of water absorbent shells made from natural coconut husks. Cotton pads are placed between the shells for further water storage and slow persistent release. An amount of plant nutrient and water filtering carbon material is placed within the cotton pads for disbursement to the root system of a plant. The husks and cotton pads are stacked and wrapped in a mesh material. The device is buried in a planter in close proximity to a root system of a plant.

14 Claims, 10 Drawing Sheets

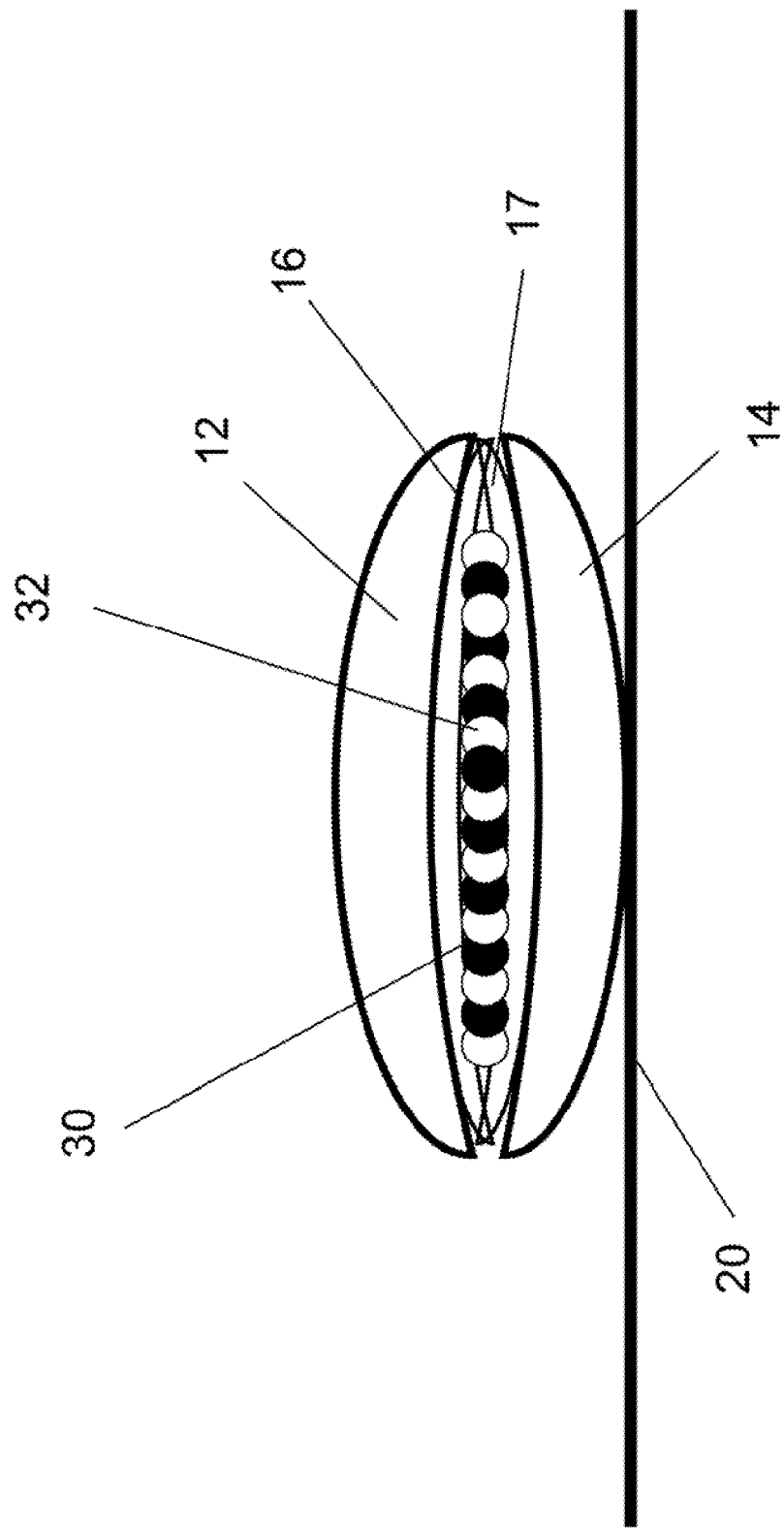

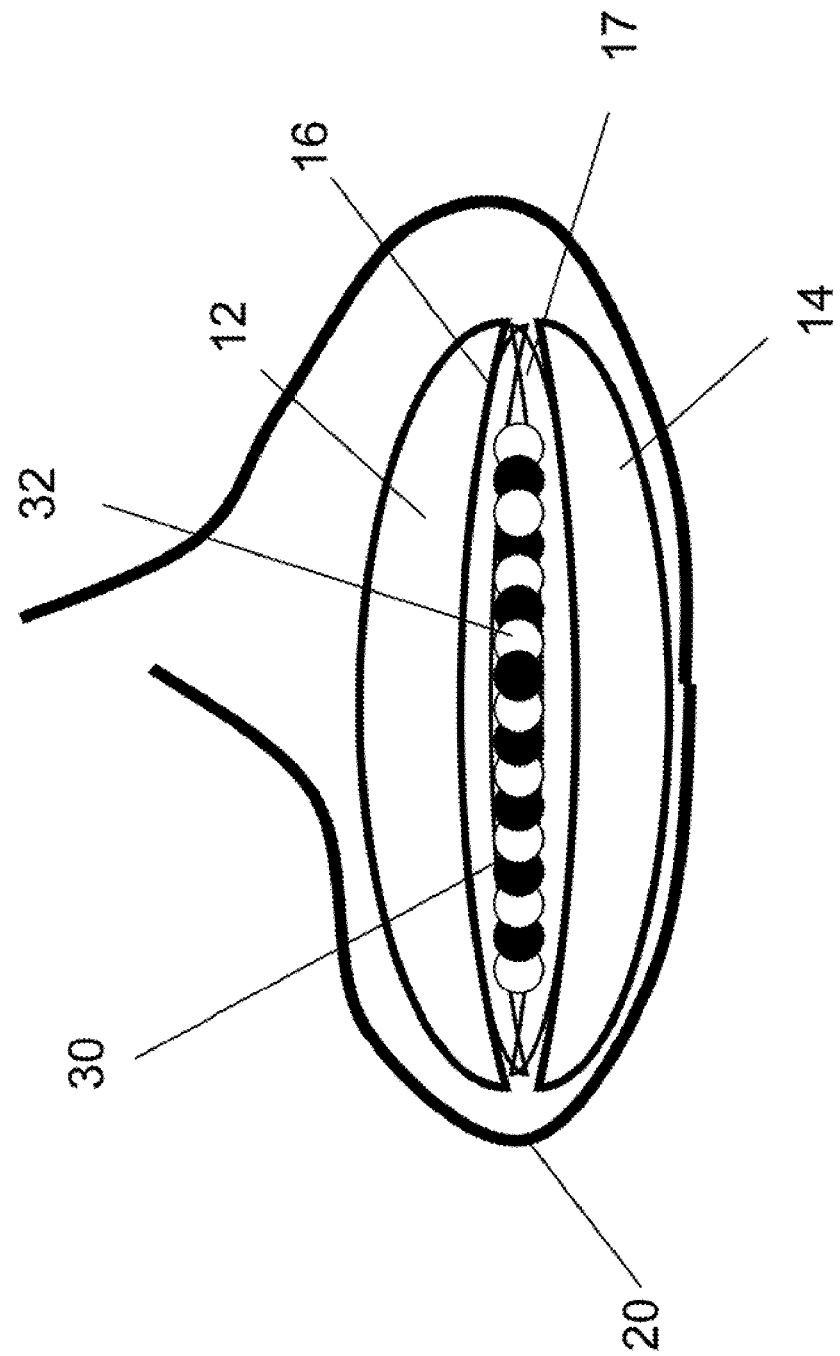

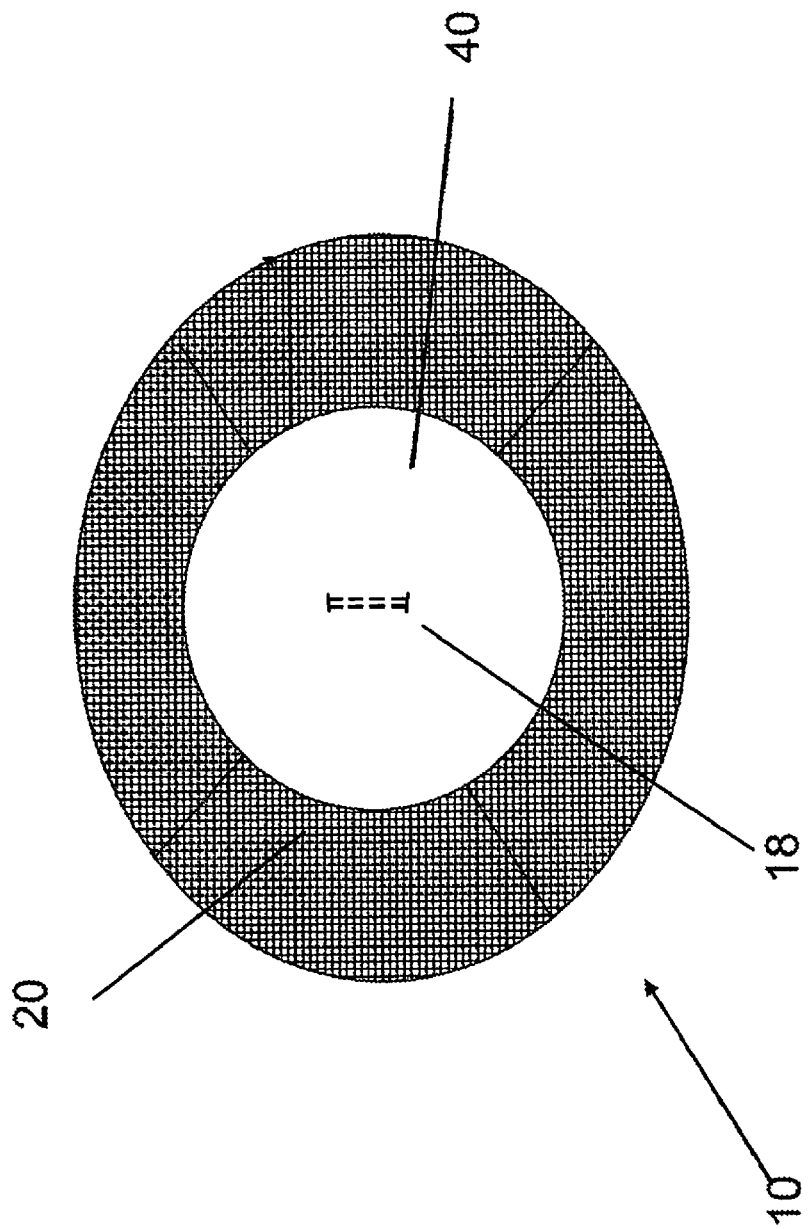

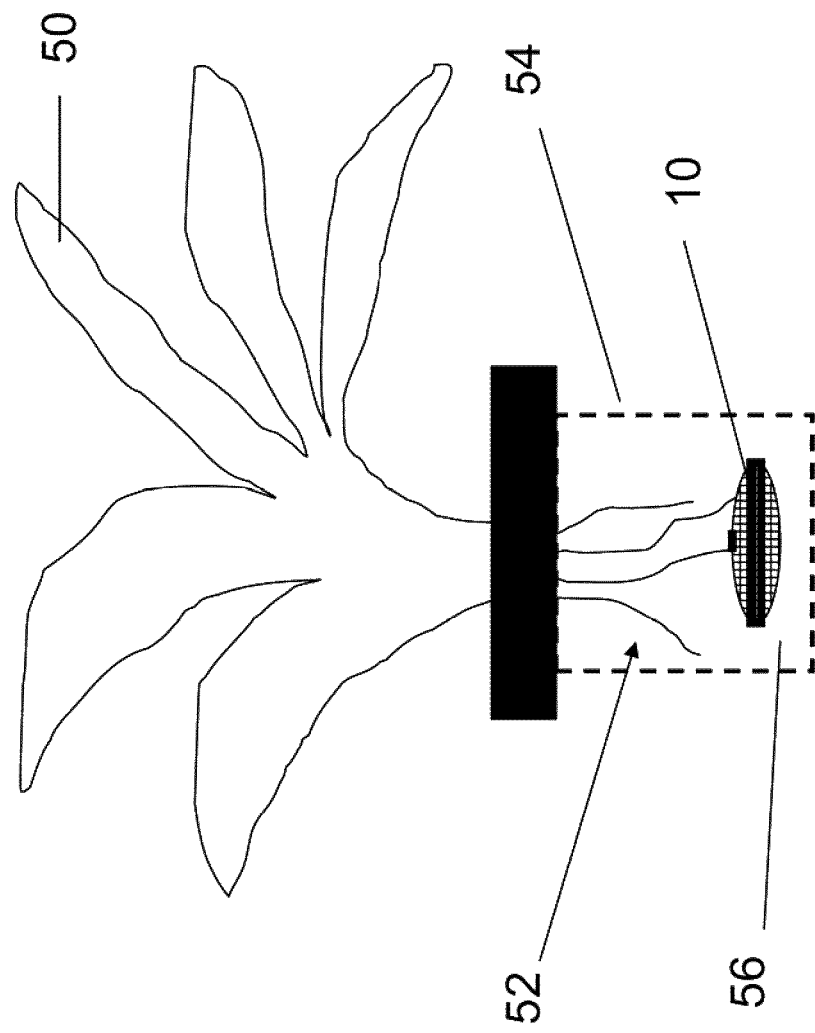

WATERING DEVICE FOR PLANT IRRIGATION

CROSS-REFERENCE TO OTHER APPLICATIONS

This application claims the benefit of U.S. Provisional Patent Application #61/097,387 "Watering Device for Plant Irrigation" filed in the USPTO on Sep. 16, 2008.

FIELD OF THE INVENTION

This invention relates to the field of plant irrigation devices and more particularly to a watering device for plant irrigation.

BACKGROUND OF THE INVENTION

Household plants, particularly those that are kept indoors, are susceptible to de-hydration. They must be watered at frequent intervals. Low humidity indoor environments promote the de-hydration of plants and the soil they are rooted in. Plant death by de-hydration can occur quickly if the care-taker is not attentive. This creates additional costs for the care-taker in having to replace dead plants unnecessarily.

There are a number of devices available to keep plants hydrated. In one example of prior art, vermiculite or similar absorbent is mixed in with soil to maintain an acceptable soil moisture content. However, the vermiculite must be mixed in the soil and this creates additional work and can be messy. Another sample of the prior art is shown in US Patent Application 2004/0025428 "Watering Device" by De Winter. This apparatus comprises a reservoir of water and a soil probe through which the water is fed to the soil. This apparatus is made of molded plastic and has plastic parts in the soil and above the soil. This makes this device obtrusive and unnatural. The need to fabricate molded parts from a suitable thermoplastic material makes this device less than environmentally benign.

Therefore there is a need to be able to inexpensively and naturally hydrate the root systems of plants. It would also be beneficial to hydrate and provide a nutrient to the plant at the same time.

SUMMARY OF THE INVENTION

To overcome the deficiencies of the prior art, I have provided a plant watering device. My device comprises a first outside absorbing shell, a second outside absorbing shell and a suitable amount of absorbing material sandwiched between the two outside absorbing shells. The two outside absorbing shells are for absorbing water. They act as a water reservoir to slowly release water back to the surrounding soil and to the adjacent plant roots. The two outside shells are wrapped in a mesh material. The absorbing material sandwiched between the two shells includes a predetermined amount of a nutrient for feeding plant roots. An amount of filter medium for cleansing absorbed water is also placed in the absorbing material. The shells are made from natural coconut husk fibers and the absorbing material is a natural cotton bat.

BRIEF DESCRIPTION OF THE DIAGRAMS

Figure 1:
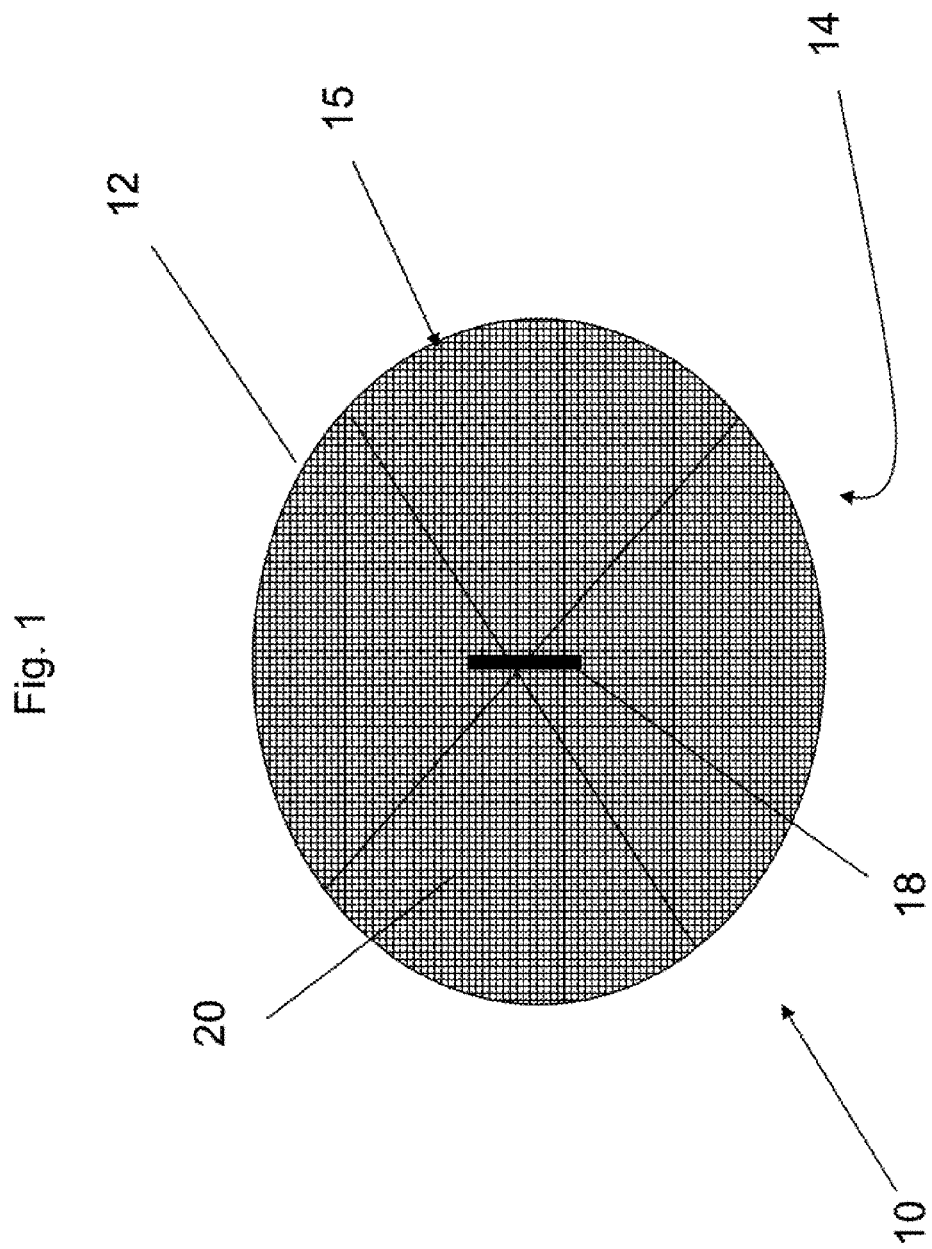
Figure 2:
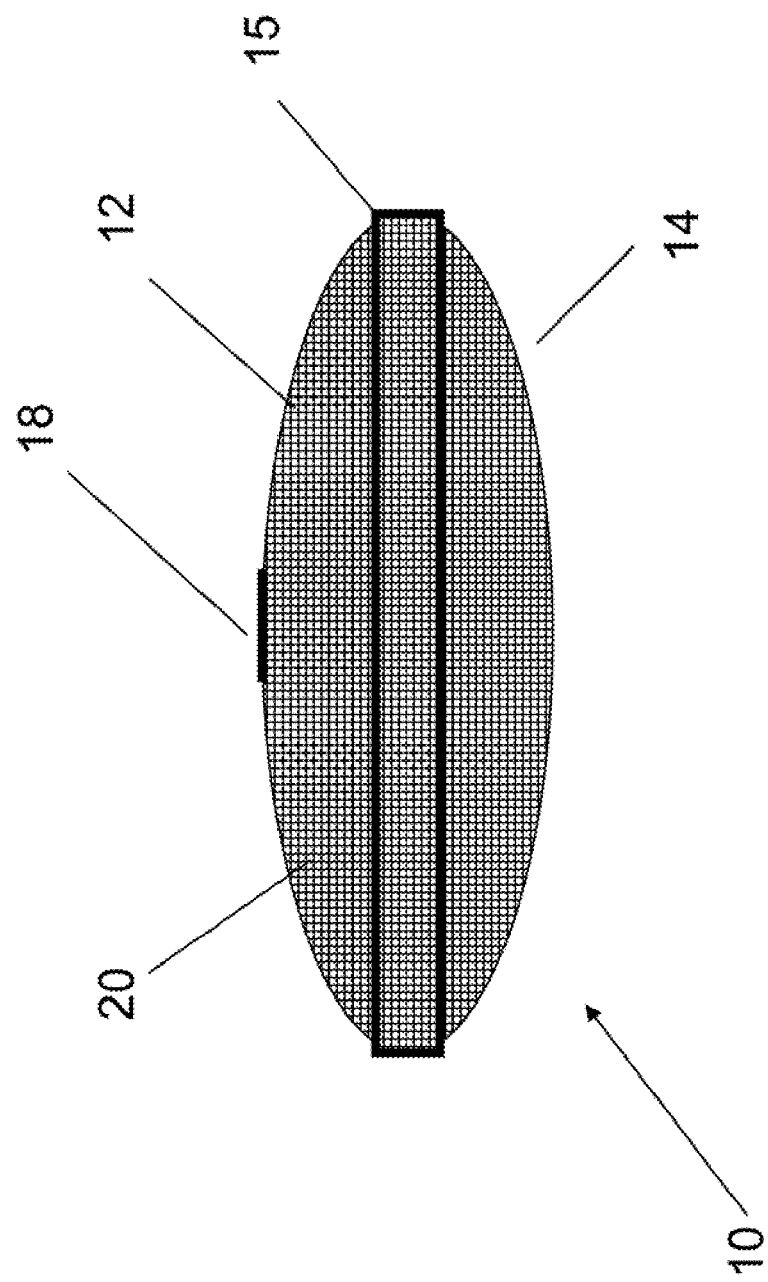
Figure 3:
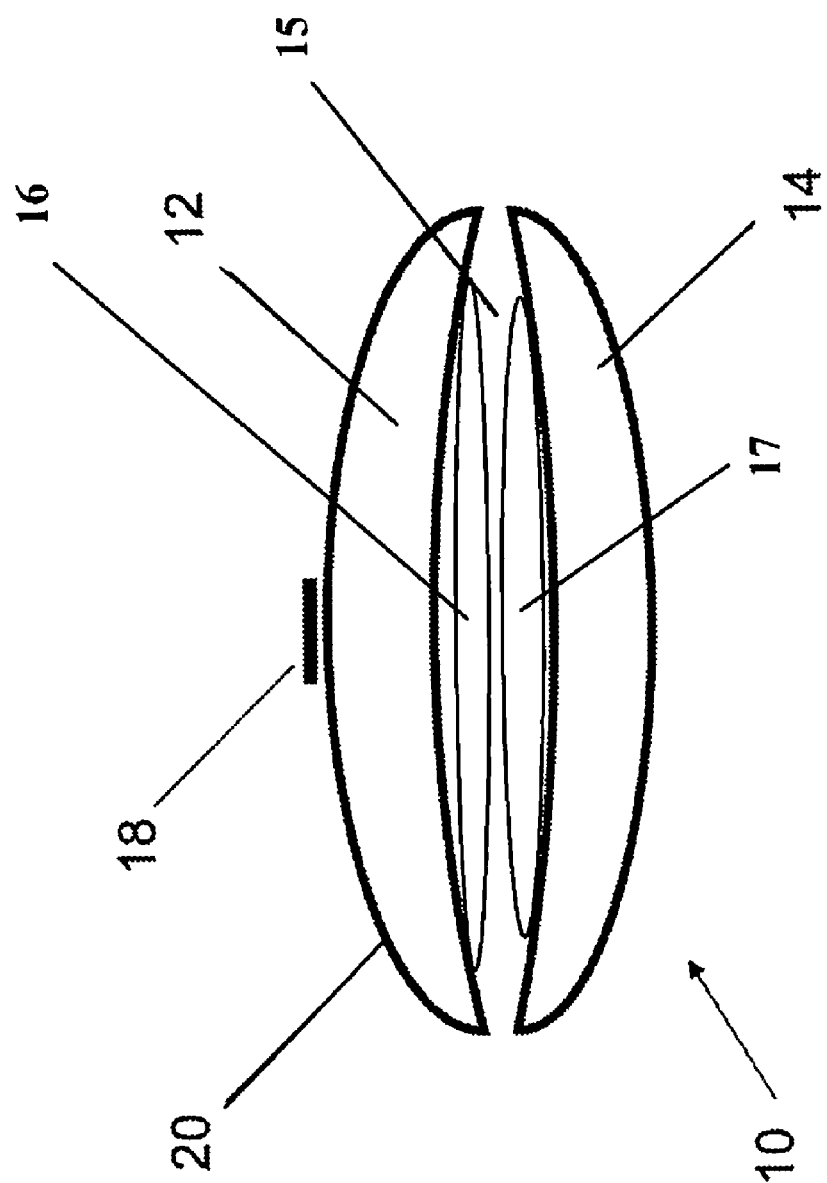
Figure 4:
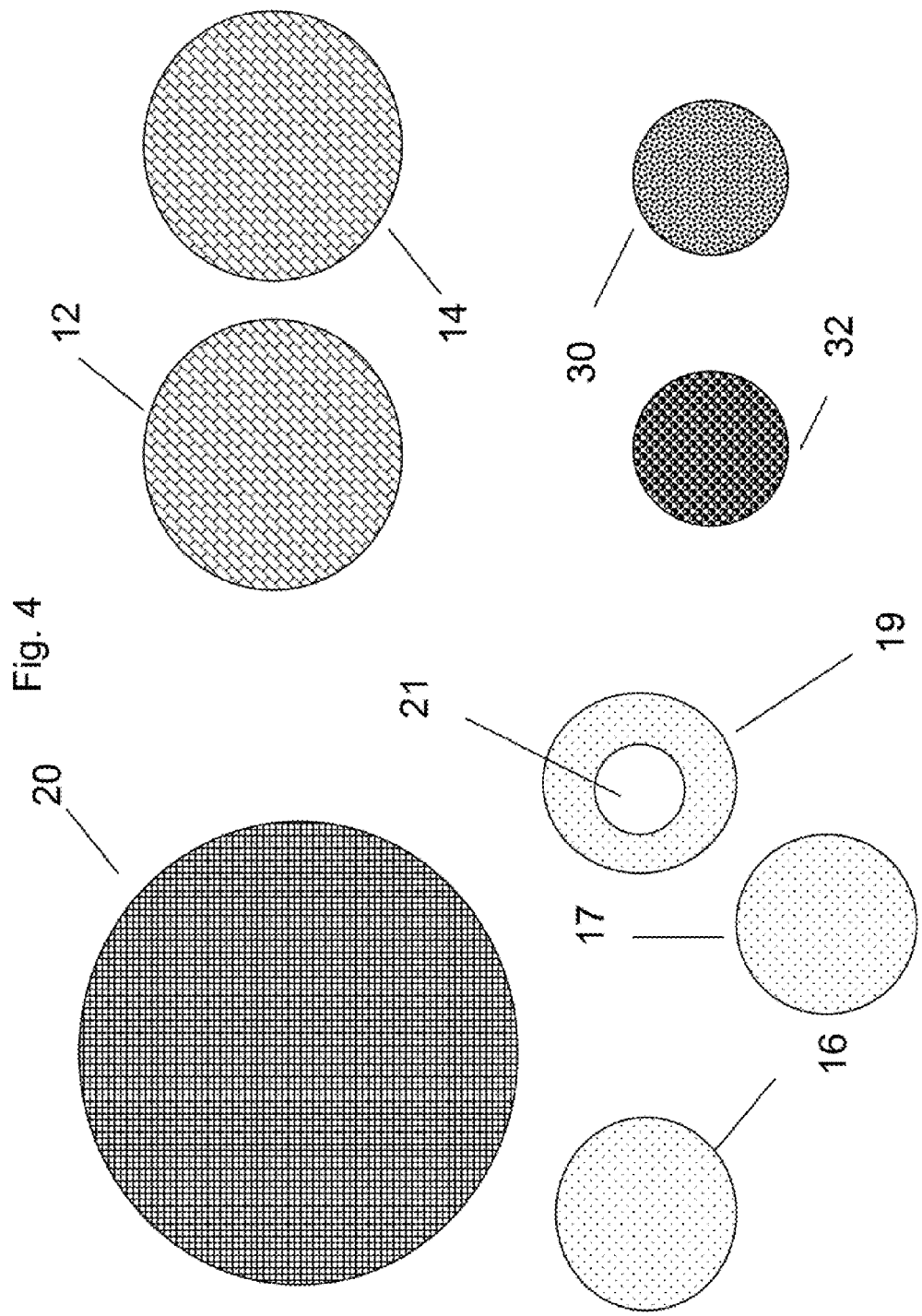
Figure 5:
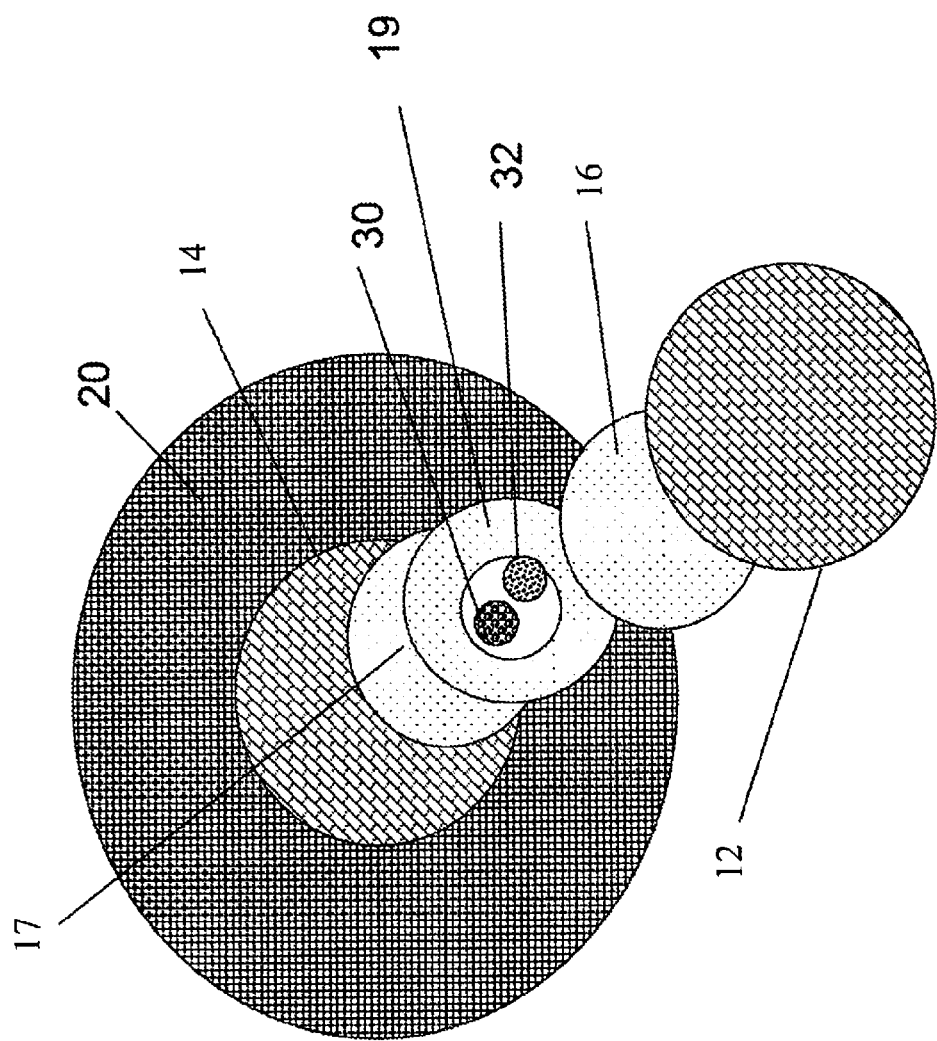
Figure 6:
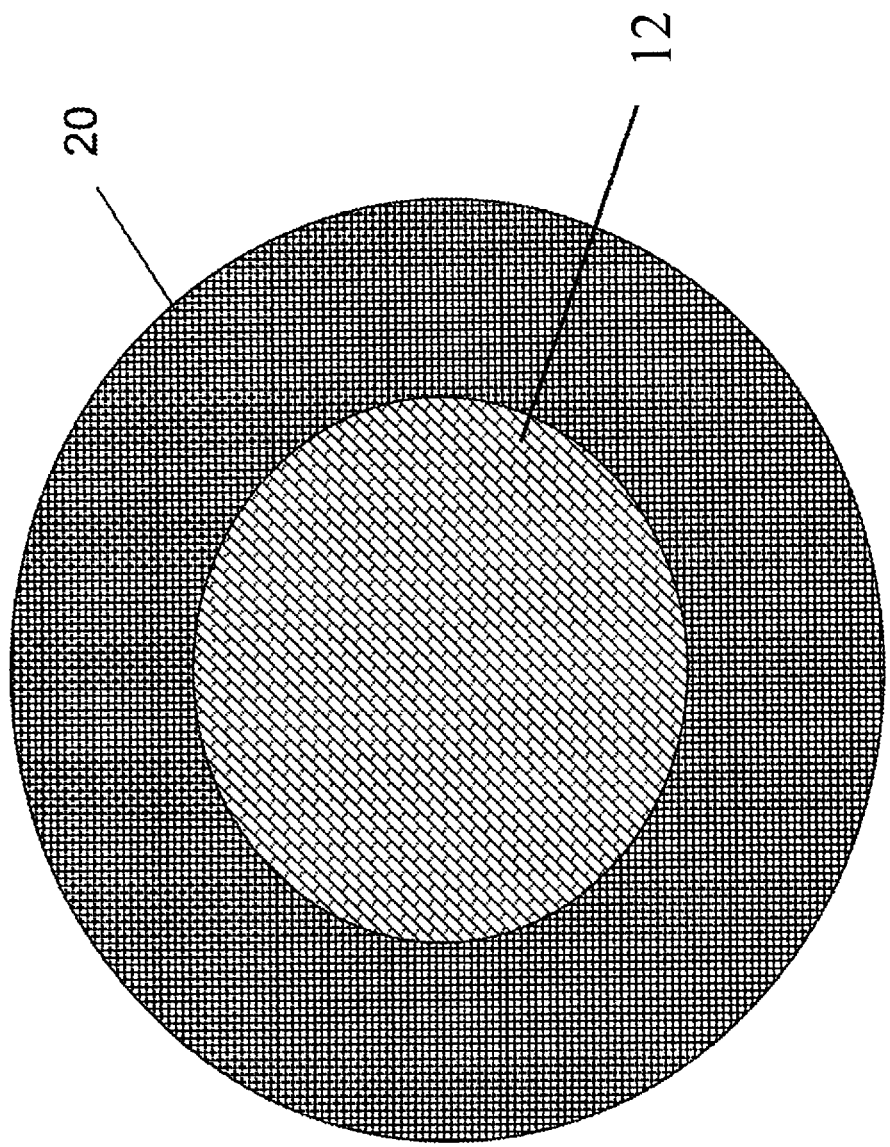

FIG. 1 is a top view of one embodiment of the invention.
FIG. 2 is a side view of one embodiment of the invention.
FIG. 3 is a cross-sectional side view of one embodiment of the invention.
FIG. 4 is a view of the components of one embodiment of the invention prior to assembly.
FIG. 5 is an assembly view of one embodiment of the invention.
FIG. 6 is a top view of a partially assembled invention prior to wrapping with mesh.
FIG. 7 is a cross-sectional side view of a partially assembled invention prior to wrapping with mesh.
FIG. 8 illustrates one embodiment of the invention being wrapped with mesh.
FIG. 9 illustrates a top view of one embodiment of the invention with a label tag.
FIG. 10 illustrates use of the invention in a plant pot.

DESCRIPTION OF THE INVENTION

Referring to FIG. 1 there is shown one embodiment of my invention 10 which is a watering device for plant irrigation. The watering device 10 comprises a water absorbent top shell 12 and a water absorbent bottom shell 14. Sandwiched between the top 12 and bottom 14 shells is an absorbent layer 15 suitable for carrying a plant nutrient and a water filtration medium. The plant watering device is wrapped in a mesh 20 that permits water to enter the device when charging it and to leave the device when it is discharging water into plant soil adjacent to the root structure of a plant (see FIG. 10). A suitable fastener 18, in this case, a staple, is shown to hold the mesh in an enclosing configuration and the constituent elements of the invention together.

Referring to FIG. 2 there is shown a diagram of the invention 10 in side view. The bottom shell 14 comprises a natural and organic absorbent material that has an inherent resistance to decay in moist and poorly oxygenated environments. In the preferred embodiment that material is coconut husk which is inexpensive and readily available. The coconut husk material is readily formed into top 12 and bottom 14 shells. As more fully explained below, these top and bottom shells are wrapped in the mesh fabric 20 and enclosed with a staple 18. Between the top 12 and bottom 14 shells is an absorbent layer 15 for holding time release fertilizers and nutrients as well as water filtration media.

Referring to FIG. 3 there is illustrated a cross-sectional side view of components of an assembled sample of the invention 10 comprising a top shell 12, a bottom shell 14 and an absorbent layer 15. The absorbent layer 15 comprises a top cotton pad 16 and a bottom cotton pad 17. Not shown is a centrally disposed cotton washer 19 the annulus of which contains the nutrient material and water filter media. The invention is wrapped with a mesh fabric 20 and then secured with a staple 18.

Referring now to FIG. 4 there is shown in top view the constituent parts of the invention. The mesh fabric 20 is a synthetic fabric screen such as nylon or rust resistant metal screen material as might be used on a screen door. The mesh grade may be varied to suit the size of the application. Larger examples of the invention may have coarser mesh while small examples may have a finer mesh. To a certain degree, the mesh will determine the rate at which water escapes the device.

The top 12 and bottom 14 shells are made from coconut husks which are known for their water absorbent characteristics, resistance to rot and longevity. As well, the husks are a purely natural and organic material and their use underscores the environmentally benign nature of my invention. Elements 16, 17 and 19 are made from a suitable absorbent material. In a preferred embodiment, 16 and 17 are natural cotton fiber pads. Element 19 is a cotton pad with a centre portion removed to form an annulus 21 in which the nutrient and filter material are placed. The absorbent nature of the cotton acts to store water in all three cotton elements. The nutrient material is dissolved within the annulus 21 and leaches its way through the husk into the surrounding soil where it is absorbed by the plant roots. The cotton fiber can be purchased as cotton wafers or as bats. The nutrient 30 can be any suitable water soluble slow-release fertilizing agent. The filter medium 32 is charcoal and is used to cleanse the water as it is released to the plant.

Referring to FIG. 5, there is shown an assembly diagram of one embodiment of the invention. The dimensions of the items shown depend on the size of the device being assembled. A circular piece of mesh 20 is placed on a surface. Then the bottom shell 14 is placed in the center of the mesh. A first cotton pad 17 is placed in the centre of the bottom shell 14. The cotton washer 19 is placed over the first cotton pad 17. Nutrient material 30 and charcoal filter media 32 are placed within the center of the cotton washer. A second cotton pad 16 is placed over the nutrient material and charcoal. The top shell 12 is placed upon the second cotton pad 16.

Referring to FIG. 6 prior to final assembly of the device, the top shell 12, with the other constituent parts stacked below it, is illustrated in the center of the mesh material 20 awaiting wrapping.

FIG. 7 illustrates a partially assembled device in cross-section. The top 12 and bottom 14 coconut shells are disposed upon the mesh 20 awaiting wrapping. Placed between the shells are cotton fiber pads 16 and 17. Between them is cotton washer pad 19 (although it is not illustrated to avoid clutter in the diagram). The nutrient material 30 is illustrated as a black dot and the filter media 32 is illustrated as a white dot. It is to be understood that these two materials are well mixed within the device.

Referring to FIG. 8, in the wrapping of the invention, the flexible mesh material is pulled tight around the top 12 and bottom shells 14 and the mesh material is gathered at the top of the device.

Referring to FIG. 9, the mesh is secured with a staple 18 shown in broken line. A tag 40 may be fixed over the staple for placement of trade-marks or instructions for use.

Referring to FIG. 10, there is illustrated a plant 50 within a pot 54 shown in cross-section. The plant root structure 52 is buried in potting soil 56. The device 10 is first soaked in water and buried below the plant root structure 52 so that water and nutrients can disburse into the soil close to the roots. Preferably the device is near the bottom of the pot prior to planting the plant. This will keep the plant well hydrated and fed.

Although the description above contains much specificity, these should not be construed as limiting the scope of the invention but as merely providing illustrations of some of the presently preferred embodiments of this invention. Thus the scope of the invention should be determined by the appended claims and their legal equivalents.

What is claimed is:

1. A plant watering device comprising a top water absorbing shell, a bottom water absorbing shell, a layer of water absorbing material disposed in a stacked configuration between said top and said bottom shells, mesh material for tightly wrapping the top shell and bottom shell sandwiched together, and a fastener for fastening the mesh material around the top and bottom shells.

2. The device of claim 1 wherein said layer of water absorbing material comprises a top absorbing pad disposed beneath the top shell, a bottom absorbing pad disposed above the bottom shell and a central absorbing pad disposed between said bottom and said top absorbing pads.

3. The device of claim 2 wherein said central absorbing pad includes a centrally disposed annulus.

4. The device of claim 3 wherein a first predetermined amount of a nutrient for feeding plant roots is placed within said centrally disposed annulus.

5. The device of claim 4 wherein a second predetermined amount of filter medium for cleansing absorbed water is placed within the centrally disposed annulus.

6. The device of claim 1 wherein said mesh material is a metallic screen material.

7. The device of claim 1 wherein the mesh material is a synthetic material.

8. The device of claim 7 wherein the synthetic mesh material is nylon.

9. The device of claim 1 wherein the first absorbing shell and the second absorbing shell are made from natural coconut husk fibers.

10. The device of claim 1 wherein the layer of water absorbing material is made from natural cotton fiber.

11. The water device as claimed in claim 5 wherein said filter medium is charcoal.

12. A method of assembling a plant watering device comprising the steps of:
 a. Taking a circular flat piece of mesh material having a first diameter;
 b. Taking a first coconut husk absorbing shell and placing it on said circular piece of mesh material wherein the diameter of said first coconut husk is less than said first diameter screen;
 c. Placing a first cotton fiber pad on the surface of the first coconut husk;
 d. Placing a first cotton fiber washer having an annulus on the surface of said first cotton fiber pad;
 e. Placing a suitable first amount of nutrient material within said annulus;
 f. Placing a suitable second amount of filter material within the annulus;
 g. Placing a second cotton fiber pad on the surface of said first cotton fiber washer;
 h. Placing a second coconut husk absorbing shell over said second cotton fiber pad;
 i. Wrapping the circular flat piece of mesh material around the first and second coconut husks;
 j. Securing the mesh material with a staple; and,
 k. Affixing a brand label to the secured stacked material.

13. The method of claim 12 further including the step of soaking the assembled device in water.

14. The method of claim 13, further including the step of placing the soaked device in proximity to a plant root system.

\* \* \* \* \*